United States Patent
Bender et al.

(10) Patent No.: US 10,244,109 B2
(45) Date of Patent: Mar. 26, 2019

(54) DETECTION OF A SPEAR-PHISHING PHONE CALL

(71) Applicant: International Business Machines Corporation, Armonk, NY (US)

(72) Inventors: Michael Bender, Rye Brook, NY (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/209,052

(22) Filed: Jul. 13, 2016

(65) Prior Publication Data
US 2018/0020092 A1 Jan. 18, 2018

(51) Int. Cl.
*H04M 3/42* (2006.01)
*H04M 7/00* (2006.01)
(Continued)

(52) U.S. Cl.
CPC ........ *H04M 3/436* (2013.01); *H04L 63/1408* (2013.01); *H04L 63/1441* (2013.01);
(Continued)

(58) Field of Classification Search
CPC ........... G06F 2221/2119; G06F 21/566; G06F 21/554; G06F 21/55; G06F 21/56;
(Continued)

(56) References Cited

U.S. PATENT DOCUMENTS

| 7,307,997 B2 | 12/2007 | Vinokurov et al. |
| 7,613,286 B2 | 11/2009 | Hong |

(Continued)

FOREIGN PATENT DOCUMENTS

| CN | 103458412 A | 12/2013 |
| CN | 105072137 A | 11/2015 |

(Continued)

OTHER PUBLICATIONS

"Target hackers Broke in via HVAC Company", Krebs on Security, http://krebsonsecurity.com/2014/02/target-hackers-broke-in-via-hvac-company/, Feb. 2014, 17 pages.
(Continued)

*Primary Examiner* — Ahmad F. Matar
*Assistant Examiner* — Kharye Pope
(74) *Attorney, Agent, or Firm* — Francis Lammes; Stephen J. Walder, Jr.; Jeffrey S. LaBaw (57) ABSTRACT

A mechanism is provided for detection of a spear-phishing phone call. Responsive to an individual receiving a phone call, a determination is made as to whether the phone call has one or more identifiable traits from a set of identifiable traits that are identified as being associated with spear-phishing. Responsive to identifying that the phone call has one or more identifiable traits from the set of identifiable traits that are identified as being associated with spear-phishing, an associated weighted risk value for each of the identified traits associated with the phone call is identified from the set of identifiable traits. A total risk value is calculated using each weighted risk value associated with each identified trait associated with the phone call. Responsive to the total risk value exceeding a predetermined risk value, the individual is notified of the total risk value to enable the individual to take an appropriate action based on the total risk value.

16 Claims, 4 Drawing Sheets

(51) Int. Cl.
*H04L 29/06* (2006.01)
*H04L 29/08* (2006.01)
*H04M 3/436* (2006.01)
*G10L 15/08* (2006.01)
*G10L 17/26* (2013.01)

(52) U.S. Cl.
CPC .......... *H04L 65/1079* (2013.01); *H04L 67/02* (2013.01); *H04M 3/42042* (2013.01); *G10L 17/26* (2013.01); *G10L 2015/088* (2013.01); *H04M 3/42059* (2013.01); *H04M 2201/12* (2013.01); *H04M 2201/40* (2013.01); *H04M 2201/41* (2013.01); *H04M 2203/6027* (2013.01)

(58) Field of Classification Search
CPC ............. G06F 17/30876; G06F 21/577; G06F 21/6245; H04L 63/1483; H04L 63/1416; H04L 51/12; H04L 63/1433; H04L 63/1441; H04L 63/1466; H04L 67/02; H04L 63/145; H04M 3/42042; H04M 3/436; H04M 2201/38; H04M 1/57; H04M 3/42059; H04M 3/4365; H04M 15/47; H04M 15/8351; H04M 15/8353; H04M 1/00; H04M 1/663; H04M 1/72597; H04M 2203/2038; H04M 2203/6027
USPC ...... 379/114.14, 93.17, 130, 142.05, 142.17, 379/210.02, 210.03, 88.12; 455/414.1, 455/566, 415, 410, 412.2
See application file for complete search history.

(56) References Cited

U.S. PATENT DOCUMENTS

| | | | |
|---|---|---|---|
| 7,853,533 B2 | 12/2010 | Eisen | |
| 8,503,645 B1 | 8/2013 | Oliver | |
| 8,509,413 B2 | 8/2013 | Holtel et al. | |
| 8,990,933 B1 | 3/2015 | Magdalin | |
| 2006/0047760 A1* | 3/2006 | Encinas | G06Q 10/107 709/206 |
| 2006/0068755 A1* | 3/2006 | Shraim | H04L 12/585 455/410 |
| 2007/0101423 A1* | 5/2007 | Oliver | G06F 21/51 726/22 |
| 2007/0150276 A1* | 6/2007 | Srivastava | H04L 12/585 704/246 |
| 2007/0299916 A1* | 12/2007 | Bates | G06Q 10/107 709/206 |
| 2009/0006532 A1* | 1/2009 | Sinn | H04L 51/12 709/203 |
| 2009/0044264 A1* | 2/2009 | Ramanathan | G06F 21/552 726/14 |
| 2009/0136013 A1* | 5/2009 | Kuykendall | H04M 1/575 379/142.17 |
| 2009/0144308 A1* | 6/2009 | Huie | G06Q 10/107 |
| 2009/0275005 A1* | 11/2009 | Haley | G09B 19/04 434/169 |
| 2010/0281536 A1* | 11/2010 | Richards | G06F 21/552 726/22 |
| 2011/0055922 A1* | 3/2011 | Cohen | G06F 21/554 726/22 |
| 2011/0211682 A1* | 9/2011 | Singh | H04M 1/57 379/142.05 |
| 2012/0030293 A1* | 2/2012 | Bobotek | G06Q 10/10 709/206 |
| 2014/0123261 A1* | 5/2014 | Blair | H04L 51/00 726/7 |
| 2014/0173726 A1* | 6/2014 | Varenhorst | H04L 63/1416 726/22 |
| 2014/0283035 A1 | 9/2014 | Sawhney et al. | |
| 2014/0331119 A1* | 11/2014 | Dixon | H04L 63/168 715/234 |
| 2015/0055763 A1 | 2/2015 | Guerra et al. | |
| 2015/0106265 A1* | 4/2015 | Stubblefield | G06Q 20/4016 705/44 |
| 2015/0118660 A1* | 4/2015 | Kovin | G09B 5/02 434/157 |
| 2015/0229664 A1* | 8/2015 | Hawthorn | H04L 63/1433 726/25 |
| 2015/0237061 A1* | 8/2015 | Shraim | H04L 51/12 726/22 |
| 2015/0269946 A1* | 9/2015 | Jones | G10L 17/22 704/273 |
| 2015/0287332 A1* | 10/2015 | Tseng | G09B 7/02 434/362 |
| 2015/0288791 A1 | 10/2015 | Weiss et al. | |
| 2016/0014151 A1* | 1/2016 | Prakash | H04L 63/1483 726/22 |
| 2016/0044054 A1* | 2/2016 | Stiansen | H04L 63/1416 726/24 |
| 2016/0182716 A1* | 6/2016 | Tatourian | H04M 3/436 455/413 |
| 2016/0219150 A1* | 7/2016 | Brown | H04M 3/5235 |
| 2016/0269908 A1* | 9/2016 | Richards | H04W 12/12 |
| 2016/0308897 A1* | 10/2016 | Chapman | G06F 3/04842 |
| 2017/0150353 A1* | 5/2017 | Hillis | H04W 12/12 |
| 2017/0195363 A1* | 7/2017 | Dahan | H04L 63/1483 |

FOREIGN PATENT DOCUMENTS

| | | |
|---|---|---|
| EP | 1757068 B1 | 2/2012 |
| JP | 2007323107 A | 12/2007 |
| KR | 101431596 B1 | 8/2014 |
| WO | WO2007/001394 A2 | 1/2007 |
| WO | WO2015169000 A1 | 11/2015 |

OTHER PUBLICATIONS

"Voice phishing: System to trace telephone call paths across multiple networks developed", ScienceDaily, Georgia Institute of Technology, Oct. 9, 2010, 3 pages.

* cited by examiner

DETECTION OF A SPEAR-PHISHING PHONE CALL

BACKGROUND

The present application relates generally to an improved data processing apparatus and method and more specifically to mechanisms for detecting spear-phishing phone calls.

Phishing is an attempt to acquire sensitive information such as usernames, passwords, credit card details, and even money, although indirectly, often for malicious reasons, by masquerading as a trustworthy entity in an electronic communication. Electronic communications purporting to be from popular social web sites, auction sites, banks, online payment processors or IT administrators are commonly used to lure unsuspecting victims. Phishing emails may contain links to websites that are infected with malware. Phishing is typically carried out by email spoofing or instant messaging, and often directs users to enter details at a fake website whose look and feel are almost identical to the legitimate one. Phishing is an example of social engineering techniques used to deceive users, and exploit the poor usability of current web security technologies. Attempts to deal with the growing number of reported phishing incidents include legislation, user training, public awareness, and technical security measures.

Spear-phishing is one type of phishing that is an attempt directed at specific individuals or companies. Attackers may gather personal information about their target to increase their probability of success. Spear-phishing is, by far, the most successful on the Internet today.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for detection of a spear-phishing phone call. The illustrative embodiments determine whether a phone call has one or more identifiable traits from a set of identifiable traits that are identified as being associated with spear-phishing in response to an individual receiving the phone call. The illustrative embodiments identify an associated weighted risk value for each of the identified traits associated with the phone call from the set of identifiable traits in response to identifying that the phone call has one or more identifiable traits from the set of identifiable traits that are identified as being associated with spear-phishing. The illustrative embodiments calculate a total risk value using each weighted risk value associated with each identified trait associated with the phone call. The illustrative embodiments notify the individual of the total risk value to enable the individual to take an appropriate action based on the total risk value in response to the total risk value exceeding a predetermined risk value.

The illustrative embodiments further recalculate the total risk value as additional identifiable traits are identified as the phone call proceeds. That is, as the phone call proceeds and other traits that are associated with spear-phishing are identified, the total risk value is recalculated and, in response to the recalculated total risk value exceeding the predetermined risk value, the individual is notified in order to take an appropriate action based on the recalculated total risk value.

Responsive to the total risk value exceeding the predetermined risk value, the illustrative embodiments further add at least one of a caller identifier associated with the phone call to a list of known caller identifiers associated with spear-phishing or a phone number associated with the phone call to a list of known phone numbers associated with spear-phishing. That is, so that the individual as well as other individuals may be aware of intended spear-phishing phone calls, caller identifiers and phone numbers associated with known spear-phishing attempts are updated so that future phone call analysis utilizes all identified caller identifiers and phone numbers in spear-phishing detection.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, spear-phishing is an attempt to acquire sensitive information from specific individuals or companies such as usernames, passwords, credit card details, and even money, often for malicious reasons, by masquerading as a trustworthy entity. While spear-phishing is most commonly carried out by email spoofing or instant messaging, spear-phishing also occurs in telephony, whether the phone call is a plain old telephone service (POTS) line phone call, a Voice over Internet Protocol (VoIP) phone call, a video phone call, or the like, received on a client computing device, server computing device, a tablet computer, laptop computer, telephone or other communication device, a personal digital assistant (PDA), or the like. For example, an individual receives an incoming phone call that has an associated caller identifier of "Private Line." During the call, the caller identifies himself or herself as working for a well-known software operating system company, that the caller has identified security risks on the individual's personal computer, and that the caller wants to help fix the security risks. In another example, an individual receives an incoming phone call that has no associated caller identifier and the caller identifies themselves as a local police department that is soliciting donations requesting that the individual go to a specific website to enter credit card information to make a donation. In yet another example, an individual receives an incoming phone call that has an associated caller identifier of the individual's local bank where the caller identifies himself or herself as the individual's local bank and that the individual has a problem with their account. During the call, the caller then requests the individual's account number and pin number.

In each of these examples, there may be characteristics associated with the phone call that went unnoticed by the individual and that could have indicated to the individual that the phone call was actually a spear-phishing call. For example, in the first example, two warning characteristics are that the phone call was unsolicited and that the caller identifier was "Private Line." Another warning characteristic was that the caller identified a security issue on the individual's computer, which may be okay if the individual subscribed to a computer monitoring service but would not be okay if the individual did not subscribed to a computer monitoring service. In the second example, the warning characteristics are that the phone call was unsolicited, that the phone call had no associated caller identifier, and that the caller requests the individual to go to a particular website that requests credit card information. In the last example, while the caller identifier was from the individual's local bank, the warning characteristics are that the caller is indicating that the individual has a problem with their account, where banks normally send paper mails indicating bank account issues. Other warning characteristics are that the caller is requesting the individual's bank account number and pin. Normally, the bank already has this information and would request that the individual merely verify only a portion of the account number and social security number of the individual.

While not all are exemplified above, the warning characteristics associated with the phone call as well as the caller may be, for example:

a website requested to be accessed requires personal information;
the website requested to be accessed is not listed as a trusted source by anti-virus software;
the caller requests access and or is given access by the individual to operating system (OS) functionality, such as to open a port to the computer, run a program that gives the caller control of the computer, or the like;
the phone call has an associated caller identifier of a blocked, private, or otherwise unidentifiable phone number;
the phone call number matches a known phone number associated with spear-phishing calls;
the caller identifier of the phone call matches a known caller identifier associated with spear-phishing calls;
voice analysis of the caller identifies the caller as a person known to be associated with spear-phishing calls;
voice analysis of the caller indicates a count of mispronounced words exceeding a predetermined number,
voice analysis of the caller indicates that the caller is following a known script associated with spear-phishing calls; or
voice analysis of the caller identifies key words or phrases, such as a bank account number, a social security number, or a credit card number.

Therefore, the mechanisms of the illustrative embodiments provide for detecting spear-phishing phone calls and notifying the individual receiving the phone call with an indication of the phone call being a spear-phishing phone call. That is, responsive to an individual receiving a phone call, the mechanisms determine whether the phone call has one or more identifiable traits from a set of identifiable traits that are identified as being associated with spear-phishing. Responsive to the phone call having one or more identifiable traits from the set of identifiable traits that are identified as being associated with spear-phishing, the mechanisms determine a weighted risk value associate with each of the one or more identified traits associated with the phone call. The mechanisms then calculate a total risk value using each weighted risk value associated with each of the one or more identified traits and, responsive to the total risk value exceeding a predetermined risk value, the mechanisms notify the individual of the total risk value to enable the individual to take an appropriate action based on the total risk value.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
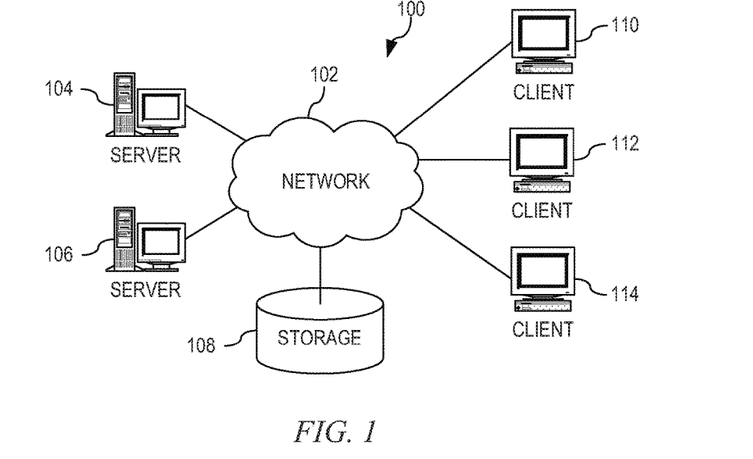
FIG. 1 is an example diagram of a distributed data processing system in which aspects of the illustrative embodiments may be implemented.
Figure 2:
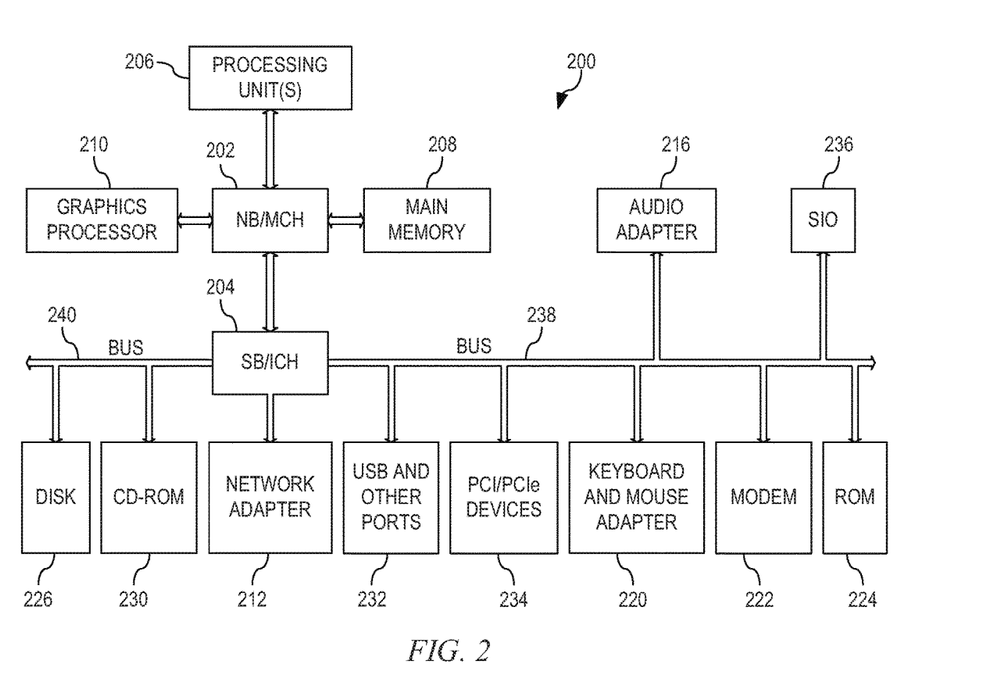
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a spear-phishing phone call detection mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates the detection of spear-phishing phone calls.

As noted above, the mechanisms of the illustrative embodiments utilize specifically configured computing devices, or data processing systems, to perform the operations for detecting spear-phishing phone calls. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the detection of spear-phishing phone calls.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
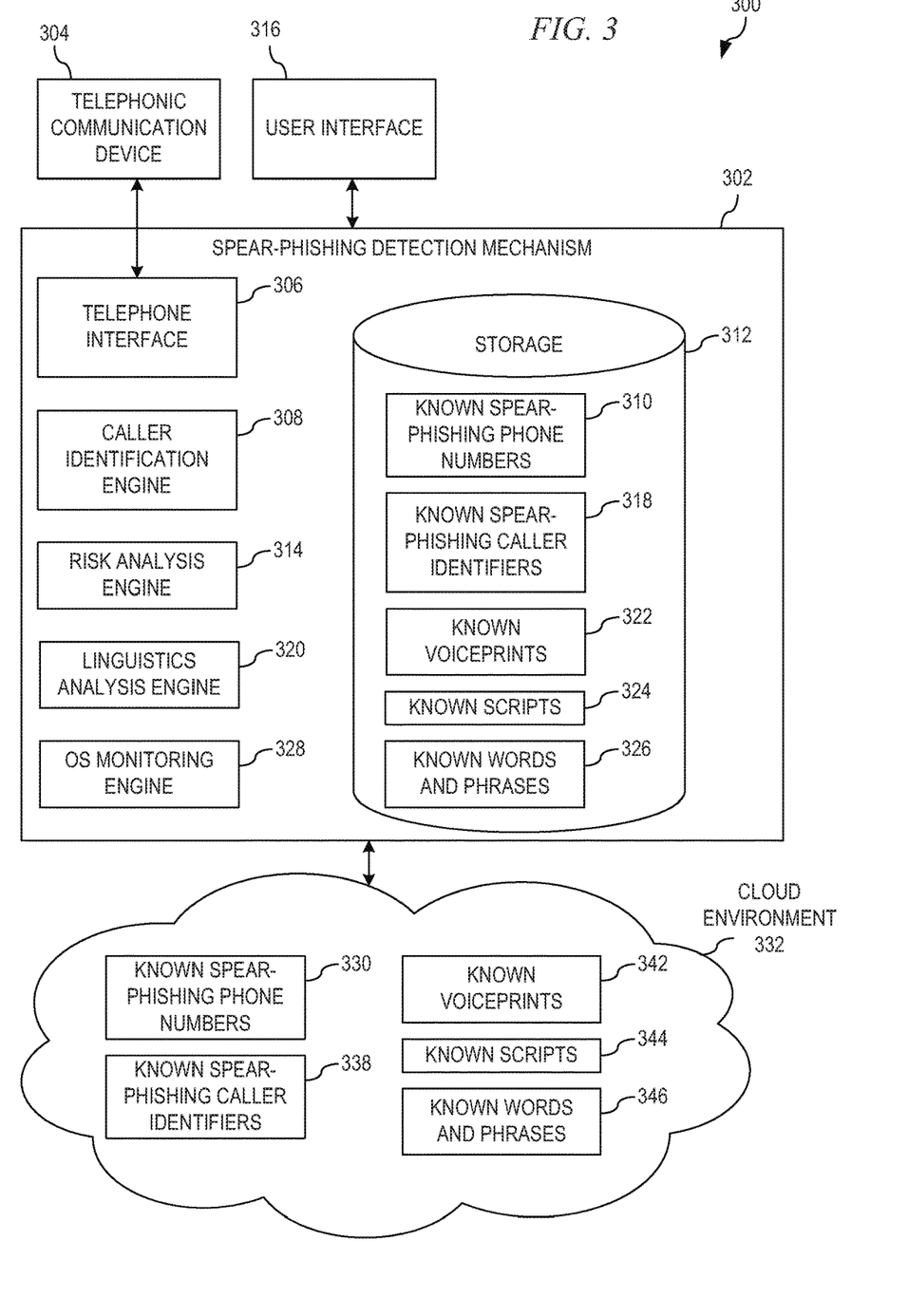
FIG. 3 depicts a functional block diagram of a spear-phishing detection mechanism in accordance with an illustrative embodiment.

FIG. 3 depicts a functional block diagram of a spear-phishing detection mechanism in accordance with an illustrative embodiment. Data processing system 300, which is a data processing system such as data processing 200 of FIG. 2, comprises spear-phishing detection mechanism 302 coupled to telephonic communication device 304. Once again, telephonic communication device 304 may be a client computing device, server computing device, a tablet computer, laptop computer, telephone or other communication device, a personal digital assistant (PDA), or the like, over which a plain old telephone service (POTS) line phone call, a Voice over Internet Protocol (VoIP) phone call, a video phone call, or the like, may be received.

Spear-phishing detection mechanism 302 is coupled to telephonic communication device 304 through telephone interface 306 such that, when an individual receives and answers a phone call, spear-phishing detection mechanism 302 monitors the phone call through telephone interface 306. Even before the individual actually answers the phone call, caller identification engine 308 within spear-phishing mechanism 302 identifies a phone number of the caller as well as any caller identifier associated with the phone number. Caller identification engine 308 compares the phone number of the caller to a list of known spear-phishing phone numbers 310 associated with spear-phishing phone calls. Caller identification engine 308 may access the list of known spear-phishing phone numbers 310 that are stored locally within storage 312 of spear-phishing detection mechanism 302 and updated regularly from a knowledge base of known spear-phishing phone numbers 330 stored in cloud environment 332 or may access the knowledge base of known spear-phishing phone numbers 330 directly. If caller identification engine 308 identifies a match of the phone number of the caller to a known spear-phishing phone number associated with spear-phishing phone calls, caller identification engine 308 identifies an associated weighted risk value associated with identifying a known spear-phishing phone number and adds this associated weighted risk value to a total risk value associated with the phone call. Once caller identification engine 308 has added the associated weighted risk value to the total risk value associated with the phone call, risk analysis engine 314 presents the initial total risk value to the individual answering the phone call through user interface 316. User interface 316 may be on a display of a desktop phone, the display of a smart phone, a display of a computer interface, or any type of user interface where the individual may be informed of the total risk value associated with the phone call. It is noted that, as will be described in the following paragraphs, the total risk value may change as the phone call proceeds. Therefore, risk analysis engine 314 continues to update the individual each time the total risk value changes based on further analysis of the phone call.

Additionally, caller identification engine 308 compares the caller identifier associated with the phone number of the caller to a list of known spear-phishing caller identifiers 318 associated with spear-phishing phone calls. The list of known spear-phishing caller identifiers 318 comprises not only specific caller identifiers of persons, businesses, or the like, associated with spear-phishing phone calls but also generic identifiers such as, blocked, private line, unknown, or otherwise unidentifiable caller identifiers. Caller identification engine 308 may access the list of known spear-phishing caller identifiers 318 that are stored locally within storage 312 of spear-phishing detection mechanism 302 and updated regularly from a knowledge base of known spear-phishing caller identifiers 338 stored in cloud environment 332 or may access the knowledge base of known spear-phishing caller identifiers 338 directly. If caller identification engine 308 identifies a match of the caller identifier associate with the phone number of the caller to a known spear-phishing caller identifier associated with spear-phishing phone calls, caller identification engine 308 identifies an associated weighted risk value associated with identifying a known spear-phishing caller identifier and adds this associated weighted risk value to the total risk value associated with the phone call. Once caller identification engine 308 has added the associated weighted risk value to the total risk value associated with the phone call, risk analysis engine 314 presents the updated total risk value to the individual who answered the phone call.

Once the individual answers the call and beings a conversation with the caller, linguistics analysis engine 320 within spear-phishing detection mechanism 302 processes the conversation to determine one or more characteristics associated with the caller. Linguistics analysis engine 320 differentiates between the caller and the individual being called by using a voiceprint of the individual with whom the phone, on which the phone call is received, is associated. Using this voiceprint, linguistics analysis engine 320 is able to focus on the caller's side of the conversation in order to look for characteristics that are indicative of a spear-phishing phone call. The process performed by linguistics analysis engine 320, as well as by operating system monitoring engine 328 discussed below, is repeated for the duration of the phone conversation.

For example, linguistics analysis engine 320 captures a voice print of the caller and compares the voiceprint to a list of known voiceprints 322 associated with spear-phishing phone calls. Linguistics analysis engine 320 may access the list of known voiceprints 322 that are stored locally within storage 312 of spear-phishing detection mechanism 302 and updated regularly from a knowledge base of known voiceprints 342 stored in cloud environment 332 or access the knowledge base of known voiceprints 342 directly. If linguistics analysis engine 320 identifies a match of the caller's voiceprint to a known voiceprint associated with spear-phishing phone calls, linguistics analysis engine 320 identifies an associated weighted risk value associated with identifying a known voiceprint and adds this associated weighted risk value to the total risk value associated with the phone call. Once linguistics analysis engine 320 has added the associated weighted risk value to the total risk value associated with the phone call, risk analysis engine 314 presents the updated total risk value to the individual who answered the phone call.

As another example, linguistics analysis engine 320 captures the words and phrases spoken by the caller and compares the words and phrases to a list of known scripts 324 associated with spear-phishing phone calls. Linguistics analysis engine 320 may access the list of known scripts 324 that are stored locally within storage 312 of spear-phishing detection mechanism 302 and updated regularly from a knowledge base of known scripts 344 stored in cloud environment 332 or access the knowledge base of known scripts 344 directly. If linguistics analysis engine 320 identifies a match of the words and phrases used by the caller to a known script associated with spear-phishing phone calls, linguistics analysis engine 320 identifies an associated weighted risk value associated with identifying a known script and adds this associated weighted risk value to the total risk value associated with the phone call. Once linguistics analysis engine 320 has added the associated weighted risk value to the total risk value associated with the phone call, risk analysis engine 314 presents the updated total risk value to the individual who answered the phone call.

As an additional example, linguistics analysis engine 320 captures the words and phrases spoken by the caller and compares the words and phrases to a list of known words and phrases 326 associated with spear-phishing phone calls, such as bank account numbers, social security numbers, credit card numbers, or the like. Linguistics analysis engine 320 may access the list of known words and phrases 326 that are stored locally within storage 312 of spear-phishing detection mechanism 302 and updated regularly from a knowledge base of known words and phrases 346 stored in cloud environment 332 or access the knowledge base of known words and phrases 346 directly. If linguistics analysis engine 320 identifies a match of the words and phrases used by the caller to a known word or phrase associated with spear-phishing phone calls, linguistics analysis engine 320 identifies an associated weighted risk value associated with identifying a known word or phrase and adds this associated weighted risk value to the total risk value associated with the phone call. Once linguistics analysis engine 320 has added the associated weighted risk value to the total risk value associated with the phone call, risk analysis engine 314 presents the updated total risk value to the individual who answered the phone call.

As a further example, linguistics analysis engine 320 captures mispronounced words, hard to understand words, or the like, spoken by the caller and counts the number of mispronounced words, hard to understand words, or the like. If linguistics analysis engine 320 identifies that the count of mispronounced words, hard to understand words, or the like, exceeds a predetermined value, linguistics analysis engine 320 identifies an associated weighted risk value associated with identifying a mispronounced words, hard to understand words, or the like, and adds this associated weighted risk value to the total risk value associated with the phone call. Once linguistics analysis engine 320 has added the associated weighted risk value to the total risk value associated with the phone call, risk analysis engine 314 presents the updated total risk value to the individual who answered the phone call.

In addition to the monitoring performed by linguistics analysis engine 320, operating system monitoring engine 328 monitors other activity associated with the computing device on which the phone call is received for suspicious activity being performed on the computing device during the phone conversation. For example, operating system monitoring engine 328 monitors the computing device for activity performed during the call such as a website being accessed that requires the individual to enter bank account numbers, social security numbers, credit card numbers, or the like. As another example, operating system monitoring engine 328 monitors the computing device for warnings that are asserted by anti-virus protection during the phone conversation, such as the detection of a virus, Trojan horse, or other malicious activity. As an additional example, operating system monitoring engine 328 monitors the computing device to determine whether remote access or control of the computer is about to or has been given to the caller, such as a port being open so that the caller is able to access the computing device, a program is initiated that allows the caller to control one or more portions of the operating system, or the like. If operating system monitoring engine 328 identifies any suspicious activity taking place on the computing device during the phone conversation, operating system monitoring engine 328 identifies an associated weighted risk value associated with identifying such suspicious activity and adds this associated weighted risk value to the total risk value associated with the phone call. Once operating system monitoring engine 328 has added the associated weighted risk value to the total risk value associated with the phone call, risk analysis engine 314 presents the updated total risk value to the individual who answered the phone call.

Again, the processes performed by linguistics analysis engine 320 and operating system monitoring engine 328 are repeated for the duration of the phone conversation. Each time a new warning characteristic is identified by an associated engine of spear-phishing detection mechanism 302 and the associated weighted risk value is added to the total risk value, risk analysis engine 314 presents the updated total risk value to the individual who answered the phone call. Based on the presented total risk value, the individual can take an appropriate action based on the total risk value, which may be either to continue with the phone conversation or end the phone conversation.

In accordance with the illustrative embodiments, if the total risk value exceeds a predetermined threshold, if the individual identifies the phone call as a spear-phishing phone call, at the end of the phone call, or based on some other predetermined criteria, spear-phishing detection mechanism 302 updates the list of known spear-phishing phone numbers 310, the list of known spear-phishing caller identifiers 318, the list of known voiceprints 322, the list of known scripts 324, and/or the list of known words and phrases 326 in storage 312 as well as the knowledge base of known spear-phishing phone numbers 330, the knowledge base of known spear-phishing caller identifiers 338, the knowledge base of known voiceprints 342, the knowledge base of known scripts 344, and/or the knowledge base of known words and phrases 346 in cloud environment 332 with previously unidentified spear-phishing phone numbers, previously unidentified spear-phishing caller identifiers, previously unidentified voiceprints, previously unidentified scripts, and/or previously unidentified words and/or phrases, respectively, that are identified during the individuals phone call with the caller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4A:
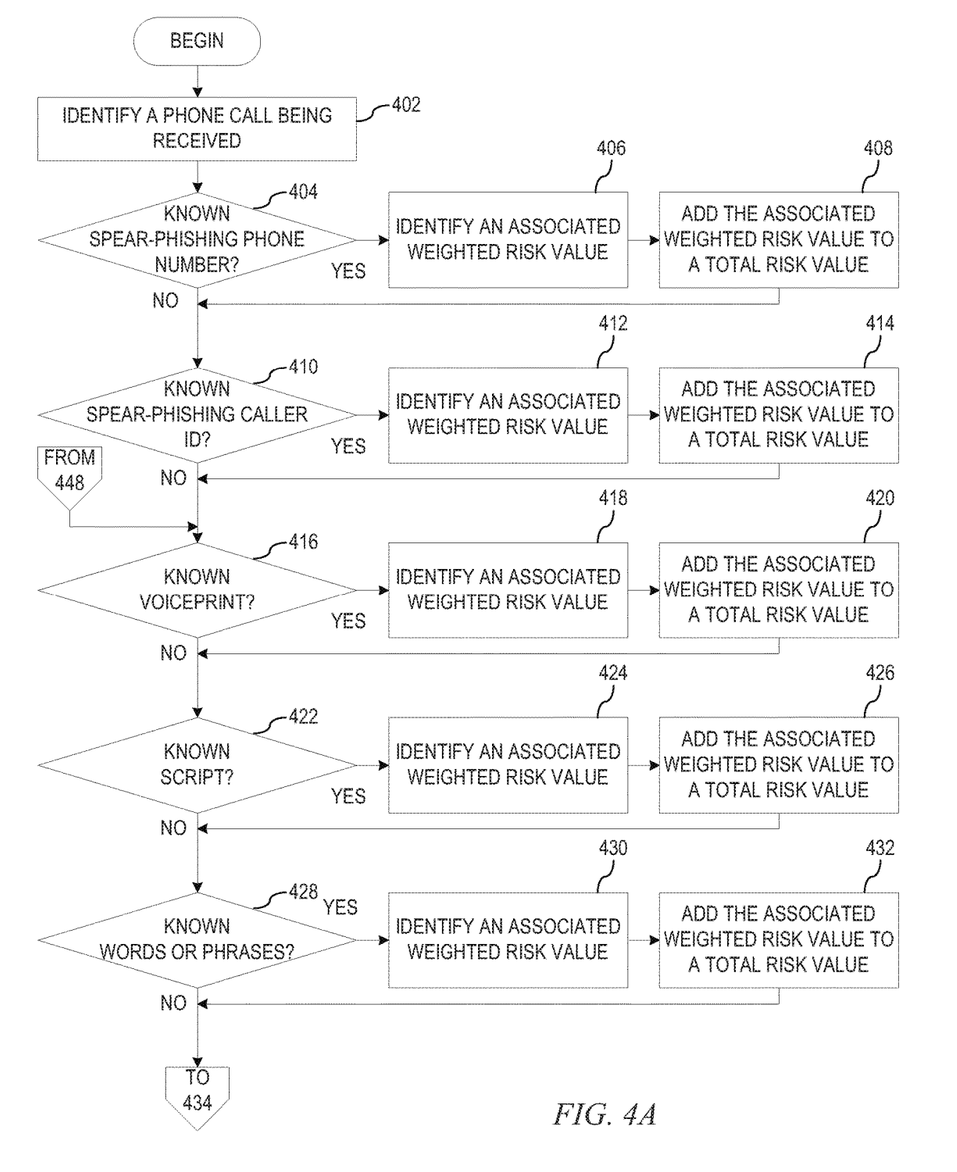
FIGS. 4A and 4B depict an exemplary flowchart of the operation performed by a spear-phishing detection mechanism in identifying a spear-phishing phone call in accordance with an illustrative embodiment.
Figure 4B:
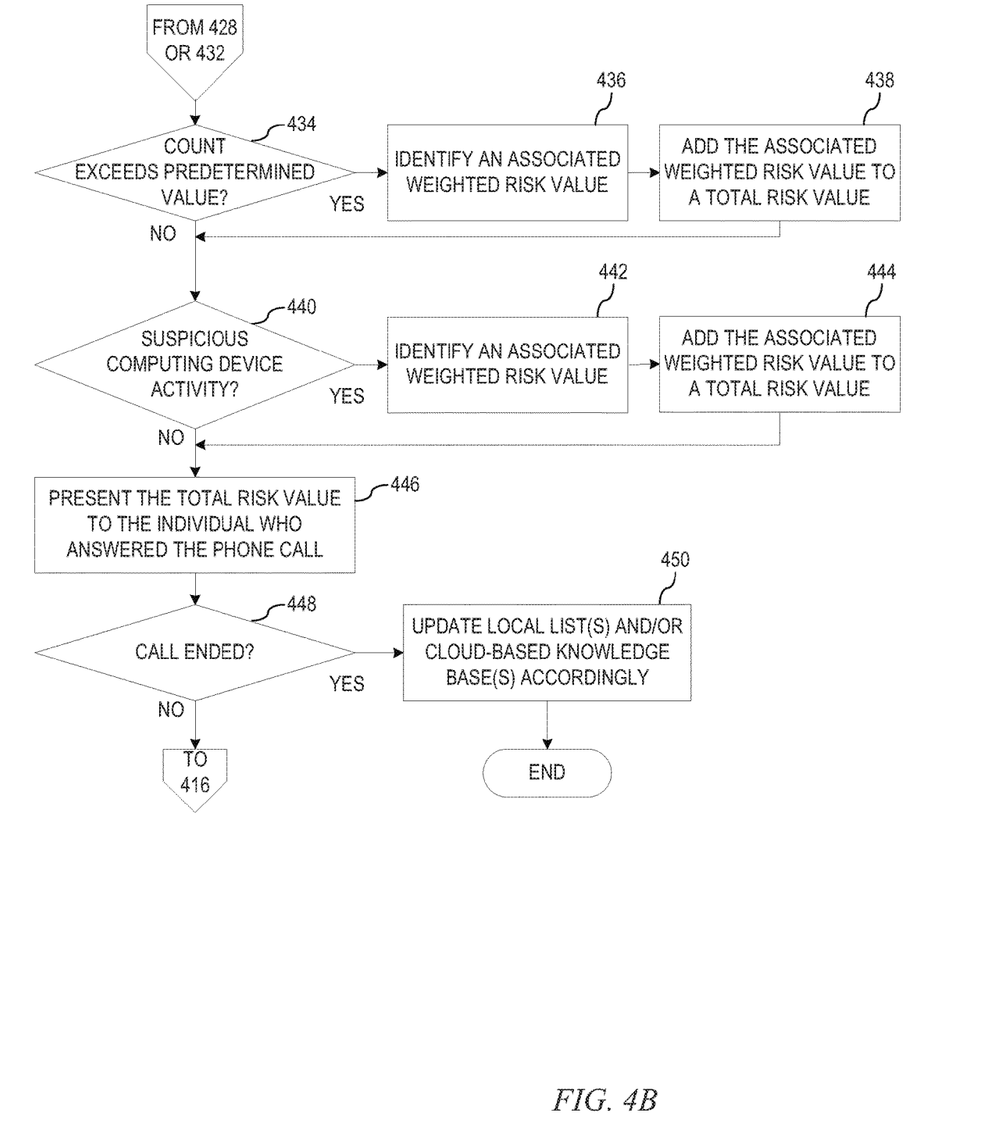

FIGS. 4A and 4B depict an exemplary flowchart of the operation performed by a spear-phishing detection mechanism in identifying a spear-phishing phone call in accordance with an illustrative embodiment. As the operation begins, spear-phishing detection mechanism identifies a phone call being received on an individual's telephonic communication device (step 402). The spear-phishing detection mechanism determines whether a phone number of the caller appears within a list of known spear-phishing phone numbers associated with spear-phishing phone calls (step 404). If at step 404 the spear-phishing detection mechanism identifies a match of the phone number of the caller to a known spear-phishing phone number associated with spear-phishing phone calls, the spear-phishing detection mechanism identifies an associated weighted risk value associated with identifying a known spear-phishing phone number (step 406) and adds the associated weighted risk value to a total risk value associated with the phone call (step 408), with the operation proceeding to step 410 thereafter.

If at step 404 the spear-phishing detection mechanism fails to identify a match of the phone number of the caller to a known spear-phishing phone number associated with spear-phishing phone calls, the spear-phishing detection mechanism determines whether a caller identifier associated with the phone number of the caller appears within a list of known spear-phishing caller identifiers associated with spear-phishing phone calls (step 410). If at step 410 the spear-phishing detection mechanism identifies a match of the caller identifier associate with the phone number of the caller to a known spear-phishing caller identifier associated with spear-phishing phone calls, the spear-phishing detection mechanism identifies an associated weighted risk value associated with identifying a known spear-phishing caller identifier (step 412) and adds this associated weighted risk value to the total risk value associated with the phone call (step 414), with the operation proceeding to step 416 thereafter.

If at step 410 the spear-phishing detection mechanism fails to identify a match of the caller identifier associated with the phone number of the caller to a known spear-phishing caller identifier associated with spear-phishing phone calls, the spear-phishing detection mechanism determines whether a voice print of the caller's voice appears within a list of known voice prints associated with spear-phishing phone calls (step 416). If at step 416 the spear-phishing detection mechanism identifies a match of the caller's voice print to a known voice print associated with spear-phishing phone calls, the spear-phishing detection mechanism identifies an associated weighted risk value associated with identifying a known voice print (step 418) and adds this associated weighted risk value to the total risk value associated with the phone call (step 420), with the operation proceeding to step 422 thereafter.

If at step 416 the spear-phishing detection mechanism fails to identify a match of the caller's voiceprint to a known voiceprint associated with spear-phishing phone calls, the spear-phishing detection mechanism determines whether the words and phrases spoken by the caller adhere to a list of known scripts associated with spear-phishing phone calls (step 422). If at step 422 the spear-phishing detection mechanism identifies a match of the words and phrases used by the caller to a known script associated with spear-phishing phone calls, the spear-phishing detection mechanism identifies an associated weighted risk value associated with identifying a known script (step 424) and adds this associated weighted risk value to the total risk value associated with the phone call (step 426), with the operation proceeding to step 428 thereafter.

If at step 422 the spear-phishing detection mechanism fails to identify a match of the words and phrases used by the caller to a known script associated with spear-phishing phone calls, the spear-phishing detection mechanism determines whether any of the words or phrases spoken by the caller appears within a list of known words and phrases associated with spear-phishing phone calls (step 428). If at step 428 the spear-phishing detection mechanism identifies a match of the words and phrases used by the caller to a known word or phrase associated with spear-phishing phone calls, the spear-phishing detection mechanism identifies an associated weighted risk value associated with identifying a known word or phrase (step 430) and adds this associated weighted risk value to the total risk value associated with the phone call (step 432), with the operation proceeding to step 434 thereafter.

If at step 428 the spear-phishing detection mechanism fails to identify a match of the words and phrases used by the caller to a known word or phrase associated with spear-phishing phone calls, the spear-phishing detection mechanism determines whether an ongoing count of mispronounced words, hard to understand words, or the like, spoken by the caller exceeds a predetermined value (step 434). If at step 434 the spear-phishing detection mechanism determines that the ongoing count of mispronounced words, hard to understand words, or the like, exceeds the predetermine value, the spear-phishing detection mechanism identifies an associated weighted risk value associated with identifying a mispronounced words, hard to understand words, or the like (step 436) and adds this associated weighted risk value to the total risk value associated with the phone call (step 438), with the operation proceeding to step 440.

If at step 434 the spear-phishing detection mechanism determines that the ongoing count of mispronounced words, hard to understand words, or the like, fails to exceed the predetermine value, then the spear-phishing detection mechanism determines whether a monitoring of other activity associated with the computing device on which the phone call is received provides an indication of suspicious activity being performed on the computing device during the phone conversation (step 440), such as accessing a website being accessed that requires the individual to enter bank account numbers, social security numbers, credit card numbers, or the like; anti-virus protection issuing a warning during the phone conversation, such as the detection of a virus, Trojan horse, or other malicious activity; or remote access or control of the computer is about to or has been given to the caller, such as a port being open so that the caller is able to access the computing device, a program is initiated that allows the caller to control one or more portions of the operating system, or the like. If at step 440 the spear-phishing detection mechanism identifies any suspicious activity taking place on the computing device during the phone conversation, the spear-phishing detection mechanism identifies an associated weighted risk value associated with identifying such suspicious activity (step 442) and adds this associated weighted risk value to the total risk value associated with the phone call (step 444), with the operation proceeding to step 446.

If at step 440 the spear-phishing detection mechanism fails to identify any suspicious activity taking place on the computing device during the phone conversation, the exemplary flowchart illustrates the spear-phishing detection mechanism presents the total risk value to the individual who answered the phone call (step 446). However, as is illustrated in FIG. 3, the spear-phishing detection mechanism may present the total risk value to the user each time the total risk value increments. That is, after each of steps 408, 414, 420, 426, 432, 438, and 444, the spear-phishing detection mechanism may present the total risk value at that time to the individual who answered the phone call.

After presenting the presentation the total risk value to the individual who answered the phone call at step 446 as is currently illustrated, the spear-phishing detection mechanism determines whether the phone call has ended (step 448). If at step 448 the phone call continues, the operation returns to step 416 for further analysis by spear-phishing detection mechanism. If at step 448 the phone call has ended, then based on the total risk value exceeding a predetermined threshold, based the individual identifying the phone call as a spear-phishing phone call, or based on some other predetermined criteria, the spear-phishing detection mechanism updates one or more of the list of known spear-phishing phone numbers, the list of known spear-phishing caller identifiers, the list of known voiceprints, the list of known scripts, and/or the list of known words and phrases in the storage as well as the knowledge base of known spear-phishing phone numbers, the knowledge base of known spear-phishing caller identifiers, the knowledge base of known voiceprints, the knowledge base of known scripts, and/or the knowledge base of known words and phrases in the cloud environment with previously unidentified spear-phishing phone numbers, previously unidentified spear-phishing caller identifiers, previously unidentified voiceprints, previously unidentified scripts, and/or previously unidentified words and/or phrases, respectively, that are identified during the individuals phone call with the caller (step 450), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for detecting spear-phishing phone calls and notifying the individual receiving the phone call with an indication of the phone call being a spear-phishing phone call. Responsive to an individual receiving a phone call, the mechanisms determine whether the phone call has one or more identifiable traits from a set of identifiable traits that are identified as being associated with spear-phishing. Responsive to the phone call having one or more identifiable traits from the set of identifiable traits that are identified as being associated with spear-phishing, the mechanisms determine a weighted risk value associated with each of the one or more identified traits associated with the phone call. The mechanisms then calculate a total risk value using each weighted risk value associated with each of the one or more identified traits and, responsive to the total risk value exceeding a predetermined risk value, the mechanisms notify the individual of the total risk value to enable the individual to take an appropriate action based on the total risk value.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for detection of a spear-phishing phone call, the method comprising:
    responsive to an individual receiving a phone call from a calling party, determining whether the phone call has at least two identifiable traits from a set of identifiable traits that are identified as being associated with spear-phishing, wherein the set of identifiable traits includes an identification via voice analysis of the calling party of a count of mispronounced words exceeding a predetermined number, an identification of a website being accessed by the individual during the phone conversation that requires personal information, an identification of a website being accessed by the individual during the phone conversation is not trusted by anti-virus protection, an identification of remote access or control of the data processing system being requested or given to the caller during the phone conversation, or an identification that the phone call originates from a blocked phone number, a private phone number, or otherwise unidentifiable phone number;
    responsive to identifying that the phone call has at least two identifiable traits from the set of identifiable traits that are identified as being associated with spear-phishing, identifying an associated weighted risk value for each of the identified traits associated with the phone call from the set of identifiable traits;
    calculating a total risk value using each weighted risk value associated with each identified trait associated with the phone call; and
    responsive to the total risk value exceeding a predetermined risk value, notifying the individual of the total risk value to enable the individual to take an appropriate action based on the total risk value.

2. The method of claim 1, wherein, as the phone call proceeds the total risk value is recalculated as additional identifiable traits are identified.

3. The method of claim 1, wherein, responsive to the total risk value exceeding the predetermined risk value, adding at least one of a caller identifier associated with the phone call to a list of known caller identifiers associated with spear-phishing or a phone number associated with the phone call to a list of known phone numbers associated with spear-phishing.

4. The method of claim 1, wherein the phone call is a Voice over Internet Protocol (VoIP) phone call, a plain old telephone service (POTS) phone call, or a video phone call.

5. The method of claim 1, wherein the set of identifiable traits includes a caller identifier of the phone call matching a known caller identifier associated with spear-phishing.

6. The method of claim 1, wherein the set of identifiable traits includes a phone number of the phone call matching a known phone number associated with spear-phishing.

7. The method of claim 1, wherein the set of identifiable traits includes voice analysis of the calling party being identified as a person known to be associated with spear-phishing.

8. The method of claim 1, wherein the set of identifiable traits includes the calling party requesting key words or phrases, and wherein the key words or phrases include a bank account number, a social security number, or a credit card number.

9. A computer program product comprising a computer readable storage medium having a computer readable program stored therein, wherein the computer readable program, when executed on a computing device, causes the computing device to:
    responsive to an individual receiving a phone call from a calling party, determine whether the phone call has at least two identifiable traits from a set of identifiable traits that are identified as being associated with spear-phishing, wherein the set of identifiable traits includes an identification via voice analysis of the calling party of a count of mispronounced words exceeding a predetermined number, an identification of a website being accessed by the individual during the phone conversation that requires personal information, an identification of a website being accessed by the individual during the phone conversation is not trusted by anti-virus protection, an identification of remote access or control of the data processing system being requested or given to the caller during the phone conversation, or an identification that the phone call originates from a blocked phone number, a private phone number, or otherwise unidentifiable phone number;
    responsive to identifying that the phone call has at least two identifiable traits from the set of identifiable traits that are identified as being associated with spear-phishing, identify an associated weighted risk value for each of the identified traits associated with the phone call from the set of identifiable traits;
    calculate a total risk value using each weighted risk value associated with each identified trait associated with the phone call; and
    responsive to the total risk value exceeding a predetermined risk value, notify the individual of the total risk value to enable the individual to take an appropriate action based on the total risk value.

10. The computer program product of claim 9, wherein, as the phone call proceeds, the computer readable program further causes the computing device to recalculate the total risk value as additional identifiable traits are identified.

11. The computer program product of claim 9, wherein the computer readable program further causes the computing device to:
responsive to the total risk value exceeding the predetermined risk value, add, at least one of a caller identifier associated, with the phone call to a list of known caller identifiers associated with spear-phishing or a phone number associated with the phone call to a list of known phone numbers associated with spear-phishing.

12. The computer program product of claim 9, wherein the phone call is a Voice over Internet Protocol (VoIP) phone call, a plain old telephone service (POTS) phone call, or a video phone call.

13. An apparatus comprising:
a processor; and
a memory coupled to the processor, wherein the memory comprises instructions which, when executed by the processor, cause the processor to:
responsive to an individual receiving a phone call from a calling party, determine whether the phone call has at least two identifiable traits from a set of identifiable traits that are identified as being associated with spear-phishing, wherein the set of identifiable traits includes an identification via voice analysis of the calling party of a count of mispronounced words exceeding a predetermined number, an identification of a website being accessed by the individual during the phone conversation that requires personal information, an identification of a website being accessed by the individual during the phone conversation is not trusted by anti-virus protection, an identification of remote access or control of the data processing system being requested or given to the caller during the phone conversation, or an identification that the phone call originates from a blocked phone number, a private phone number, or otherwise unidentifiable phone number;
responsive to identifying that the phone call has at least two identifiable traits from the set of identifiable traits that are identified as being associated with spear-phishing, identify an associated weighted risk value for each of the identified traits associated with the phone call from the set of identifiable traits;
calculate a total risk value using each weighted risk value associated with each identified trait associated with the phone call; and
responsive to the total risk value exceeding a predetermined risk value, notify the individual of the total risk value to enable the individual to take an appropriate action based on the total risk value.

14. The apparatus of claim 13, wherein, as the phone call proceeds, the instructions further cause the processor to recalculate the total risk value as additional identifiable traits are identified.

15. The apparatus of claim 13, wherein the instructions farther cause the processor to:
responsive to the total risk value exceeding the predetermined risk value, add at least one of a caller identifier associated with the phone call to a list of known caller identifiers associated with spear-phishing or a phone number associated with the phone call to a list of known phone numbers associated with spear-phishing.

16. The apparatus of claim 13, wherein the phone call is a Voice over Internet Protocol (VoIP) phone call, a plain old telephone service (POTS) phone call, or a video phone call.

* * * * *